(12) United States Patent
D'Agostino et al.

(10) Patent No.: US 7,021,660 B2
(45) Date of Patent: Apr. 4, 2006

(54) ADJUSTABLE STEERING COLUMN FOR MOTOR VEHICLES

(75) Inventors: John D'Agostino, Melrose, NY (US); Mike Billert, Shaftsbury, VT (US); Ken Egnaczak, Cheshire, MA (US); Boris Konstorum, Benninston, VT (US)

(73) Assignee: NSK Steering Systems America, Inc., Bennington, VT (US)

( * ) Notice: Subject to any disclaimer, the term of this patent is extended or adjusted under 35 U.S.C. 154(b) by 249 days.

(21) Appl. No.: 10/260,594

(22) Filed: Sep. 30, 2002

(65) Prior Publication Data

US 2004/0061322 A1 Apr. 1, 2004

(51) Int. Cl.
*B62D 1/18* (2006.01)

(52) U.S. Cl. .......................................... 280/775; 74/493
(58) Field of Classification Search ................. 280/775, 280/777; 74/493
See application file for complete search history.

(56) References Cited

U.S. PATENT DOCUMENTS

| | | |
|---|---|---|
| 2,903,904 A | 9/1959 | Mackie |
| 3,285,090 A | 11/1966 | Cranbury |
| 4,041,796 A | 8/1977 | Shishido |
| 4,075,903 A | 2/1978 | Cornell |
| 4,102,218 A | 7/1978 | Naka et al. |
| 5,199,319 A | 4/1993 | Fujiu |
| 5,269,562 A | 12/1993 | Peitsmeier et al. |
| 5,409,261 A | 4/1995 | Yamaguchi |
| 5,524,927 A | 6/1996 | Toussaint |
| 5,531,317 A * | 7/1996 | Tomaru ...................... 280/775 |
| 5,562,307 A | 10/1996 | Connor |
| 5,566,585 A * | 10/1996 | Snell et al. .................... 74/493 |
| 5,593,183 A | 1/1997 | Fouquet et al. |
| 5,743,151 A | 4/1998 | Khalifa et al. |
| 5,823,062 A * | 10/1998 | Snell et al. .................... 74/493 |
| 5,931,501 A | 8/1999 | Baumann et al. |
| 5,979,938 A | 11/1999 | Menjak et al. |
| 5,984,355 A | 11/1999 | Meidanis et al. |
| 6,039,350 A | 3/2000 | Patzelt et al. |
| 6,189,405 B1 | 2/2001 | Yazane |

FOREIGN PATENT DOCUMENTS

| | | |
|---|---|---|
| DE | 4016163 | 11/1991 |
| GB | 2311839 | 10/1997 |
| JP | 09 002294 | 1/1997 |
| JP | 10029545 | 2/1998 |
| WO | WO 97/38889 | 10/1997 |

* cited by examiner

*Primary Examiner*—Ruth Ilan
(74) *Attorney, Agent, or Firm*—Hahn Loeser & Parks LLP; Michael H. Minns

(57) ABSTRACT

A tilt or rake adjustable steering column having a first or tilt lever locking mechanism and a second locking mechanism separate from the first locking mechanism. The second locking mechanism has a pivotable eccentric cam or locking wedge that engages a fixed member to hold the adjustable steering column in the event the first locking mechanisms fails. The tilt lever locking mechanism is linked by a spring to the second locking mechanism so that movement of the tilt lever locking mechanism from a locked position to an unlocked position moves the pivotable eccentric cam from an engaged position to a non-engaged position.

27 Claims, 2 Drawing Sheets

ADJUSTABLE STEERING COLUMN FOR MOTOR VEHICLES

BACKGROUND OF THE INVENTION

This invention relates generally to tilt or rake adjustable steering columns for motor vehicles and more particularly to a steering column having at least one second locking device that causes an additional holding force on the adjustable steering column in the case of a crash.

With steering columns that have a tilt or rake adjustable facility, i.e., a facility where the steering wheel can be adjusted up or down relative to the driver for optimum comfort, there is a need to ensure that, in a crash situation, the steering column remains locked in position, so that energy absorption systems or other occupant protection systems can operate properly.

The foregoing illustrates limitations known to exist in present tilt or rake adjustable steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adjustable steering column comprising: at least one moveable steering column section; a first locking mechanism to selectively lock and unlock the at least one moveable steering column section; and means for preventing vertical movement of the at least one moveable steering column section, the means for preventing vertical movement being separate from and operably engaging the first locking mechanism.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
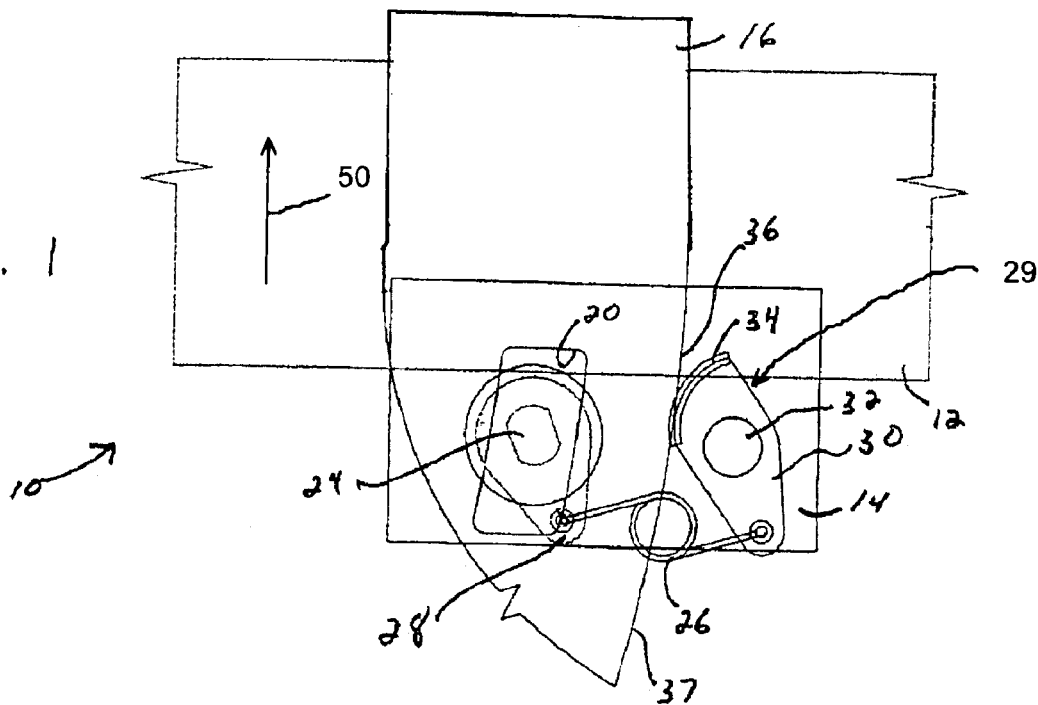
FIG. 1 is a side view of a tilt steering column showing an embodiment of the present invention with the tilt lever locked.

The figures show a tilt adjustable steering column 10 with a second locking mechanism 29 for preventing vertical movement of the steering column in a crash situation. The second locking mechanism 29 can also be used for rake adjustable steering columns. The second locking mechanism 29 is separate from the first locking mechanism, or tilt lever locking mechanism 18. In FIG. 1, a portion 12 of an adjustable steering column is shown. This steering column section 12 is moveable in a vertical direction. A typical tilt lever locking mechanism 18 is provided to permit adjustment of the steering column section 12 and to lock the steering column section 12 in an adjusted position. The tilt lever locking mechanism 18 includes a shaft 24 that extends through an adjustment slot 20 in tilt bracket 16. The upper end of tilt bracket 16 is attached to a fixed portion of the motor vehicle (not shown). Tilt bracket 16 includes a fixed generally vertical surface 36 on one side with a curved portion 37 extending below the fixed generally vertical surface 36. A distance bracket 14 is attached to the steering column portion 12 and is positioned between the steering column portion 12 and the tilt bracket 16.

Figure 3:
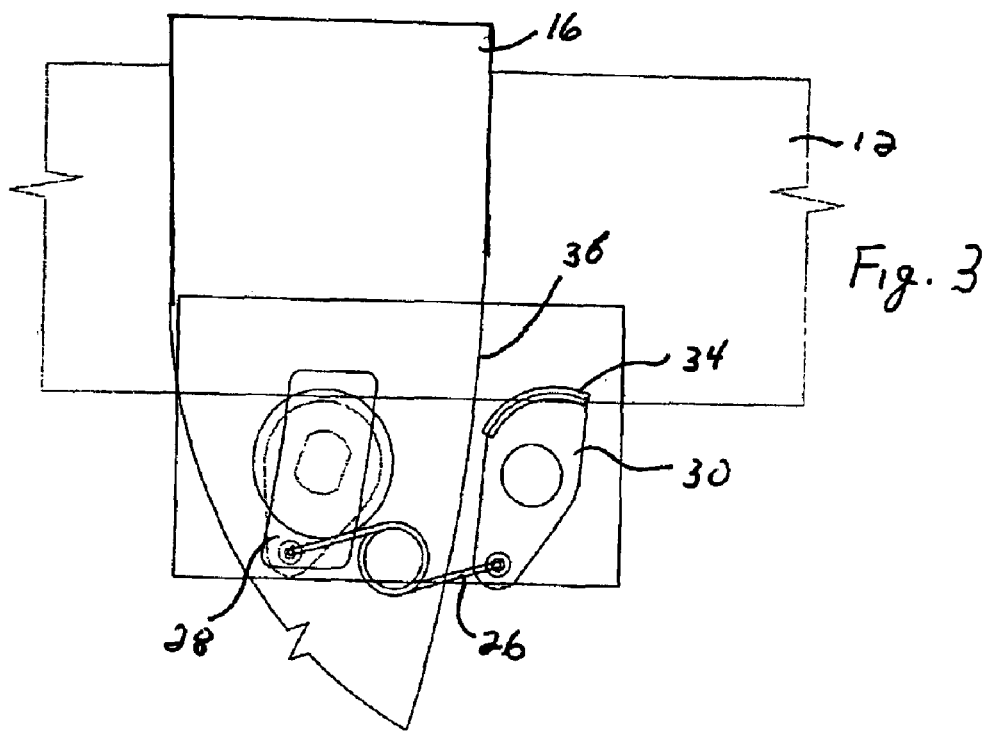
FIG. 3 is a side view of the tilt steering column shown in FIG. 1 with the tilt lever unlocked.

To adjust the steering column, the tilt lever locking mechanism 18 is moved from the locked position shown in FIG. 1 to the unlocked position shown in FIG. 3. When the tilt lever locking mechanism 18 is moved between the locked and unlocked positions, shaft 24 rotates.

The second locking mechanism 29 includes a pivotable eccentric cam or locking wedge 30 fitted on shaft 32, which is attached to distance bracket 14. Eccentric cam 30 has an curved engaging surface 34 that is normally biased by a torsion spring 26 to engage the fixed generally vertical surface 36 on the tilt bracket 16. The curvature of engaging surface 34 is eccentric to axis of shaft 32. In the event of a crash and a failure of the first locking mechanism 18, the eccentric engaging surface 34, through engagement with the generally vertical surface 36 of tilt bracket 16, locks the steering column section 12 in place to prevent vertical movement in the direction of arrow 50. As steering column section 12 moves upward, engaging surface 34, being in contact with tilt bracket 16, will rotate counterclockwise, as shown in FIG. 1. The eccentric curvature of eccentric cam 30 causes the engaging surface 34 to tighten against tilt bracket 16, thereby preventing upward movement of the steering column section 12 relative to the tilt bracket 16. The greater the vertical force on steering column section 12, the tighter locking mechanism 29 will engage the tilt bracket 16. Eccentric curved engaging surface 34 can be provided with a knurled or other friction enhancing surface treatments to increase the engagement of eccentric cam 30 with tilt bracket 16.

To allow free adjustment of steering column section 12, tilt lever locking mechanism 18 has a lever release lobe 28 fixed to shaft 24. Torsion spring 26 links the lever release lobe 28 and the eccentric cam 30. When the tilt lever locking mechanism 18 is moved to the locked position shown in FIG. 1, spring 26 rotates eccentric cam 30 to an engaged or operative position shown in FIG. 1 where eccentric cam 30 engages tilt bracket 16. Spring 26 also biases eccentric cam 30 to the engaged position. Although a torsion spring is preferred, other springs or biasing elements can be used, such as a compression spring or resilient polymeric material.

When tilt lever locking mechanism is moved to the unlocked position shown in FIG. 3, spring 26 will rotate eccentric cam 30 to a non-engaged, or in-operative position shown in FIG. 3 to allow free adjustment of steering column section 12.

Figure 2:
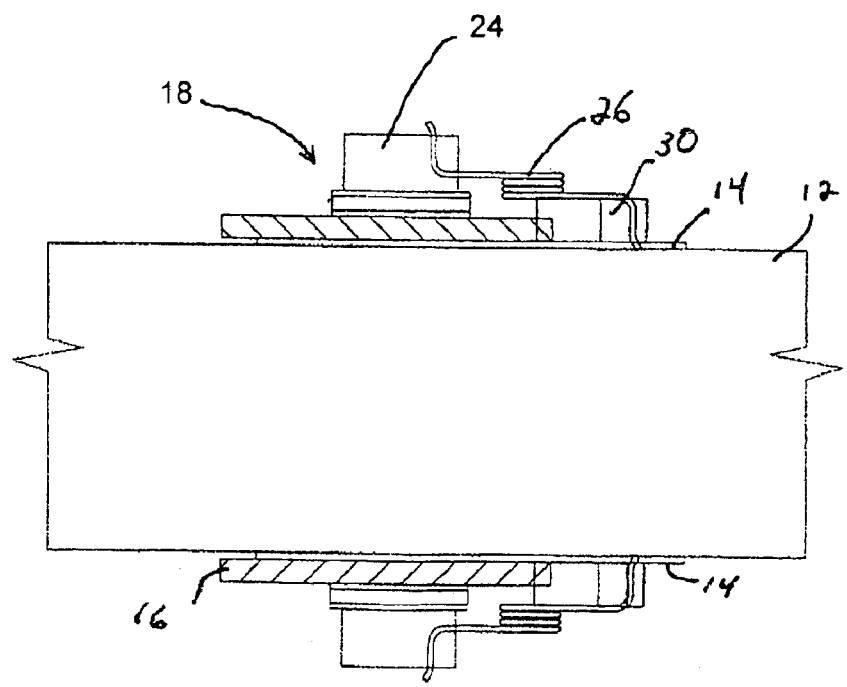
FIG. 2 is a top view, partially in cross-section, of the tilt steering column shown in FIG. 1.

Preferably, two second locking mechanisms 29 are provided, as shown in FIG. 2, one on either side of the steering column section 12.

Figure 4:
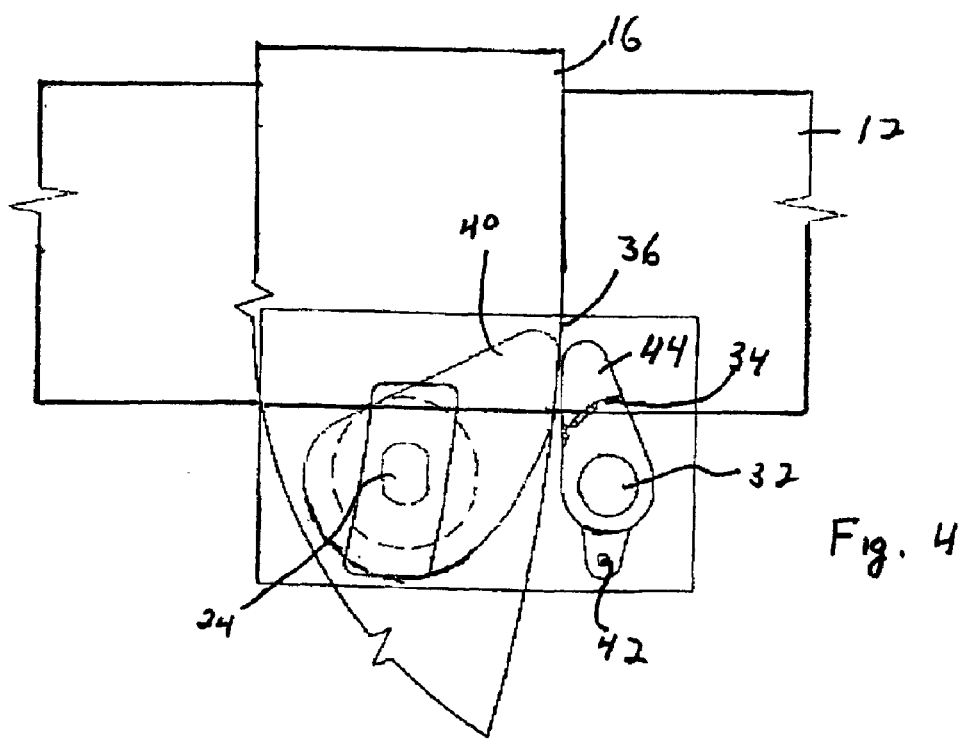
FIG. 4 is a side view of a tilt steering column showing an alternate embodiment of the present invention, with the tilt lever unlocked.

An alternate embodiment of second locking mechanism is shown in FIG. 4. An unlocking lobe 40 is attached to tilt lever locking mechanism 18. When the tilt lever locking mechanism 18 is rotated to the unlocked position shown in FIG. 4, unlocking lobe 40 engages pivotable locking wedge or eccentric cam 44 and pushes locking wedge 44 to the non-engaged position shown in FIG. 4, where eccentric engaging surface 34 does not engage tilt bracket 36, thereby permitting free adjustment of the steering column section 12. A torsion spring 42 is attached to a lower extending lobe on eccentric cam 44 and to shaft 32 to bias eccentric cam 44 to the engaged position.

Preferably, eccentric cam shaft 32 is horizontal, parallel to and offset from tilt lever locking mechanism shaft 24, as shown in the figures.

Having described the invention, what is claimed is:

1. An adjustable steering column comprising:
   at least one moveable steering column section;
   a first locking mechanism to selectively lock and unlock the at least one moveable steering column section, the first locking mechanism pivoting about a first axis; and
   at least one second locking mechanism to lock the at least one moveable steering column section against movement, the second locking mechanism pivoting about a second axis, the second axis being parallel to and radially offset from the first axis,
   wherein the at least one second locking mechanism is linked to the first locking mechanism by a resilient biasing member, whereby movement of the first locking mechanism between a locked position and an unlocked position causes movement of the at least one second locking mechanism between an operative position and an inoperative position.

2. The adjustable steering column according to claim 1, wherein the at least one second locking mechanism is biased towards the operative position.

3. The adjustable steering column according to claim 1, wherein the at least one second locking mechanism comprises a pivotable cam.

4. The adjustable steering column according to claim 3, wherein the pivotable cam has an engaging surface thereon, the engaging surface being adapted to grippingly engage a fixed surface fixed to a portion of a vehicle.

5. The adjustable steering column according to claim 4, wherein the engaging surface is an arcuate surface.

6. The adjustable steering column according to claim 5, wherein curvature of the arcuate surface is eccentric to an axis of pivot of the pivotable cam.

7. The adjustable steering column according to claim 4, wherein the fixed surface is a generally vertically extending surface.

8. The adjustable steering column according to claim 3, wherein the pivotable cam pivots about a horizontal axis.

9. The adjustable steering column according to claim 1, wherein the biasing member is a spring.

10. The adjustable steering column according to claim 1, wherein the biasing member is a torsion spring.

11. The adjustable steering column according to claim 1, wherein the number of second locking mechanisms is two.

12. An adjustable steering column comprising:
    at least one moveable steering column section;
    a first locking mechanism to selectively lock and unlock the at least one moveable steering column section; and
    a second locking mechanism to lock the at least one moveable steering column section against movement, the second locking mechanism being moved between an operative position and an inoperative position by movement of the first locking mechanism between a locked position and an unlocked position, the second locking mechanism being movably attached to the at least one moveable steering column section, the second locking mechanism grippingly engage a generally vertically extending surface, the generally vertically extending surface including a curved portion.

13. The adjustable steering column according to claim 12, wherein the second locking mechanism comprises a pivotable cam.

14. The adjustable steering column according to claim 13, wherein the pivotable cam has an engaging surface thereon, the engaging surface grippingly engaging the generally vertically extending surface.

15. The adjustable steering column according to claim 14, wherein the engaging surface is an arcuate surface.

16. The adjustable steering column according to claim 15, wherein curvature of the arcuate surface is eccentric to an axis of pivot of the pivotable cam.

17. An adjustable steering column comprising:
    at least one moveable steering column section;
    a first locking mechanism to selectively lock and unlock the at least one moveable steering column section, the first locking mechanism including a first shaft; and
    a second locking mechanism to lock the at least one moveable steering column section against movement, the second locking mechanism being moved between an operative position and an inoperative position by movement of the first locking mechanism between a locked position and an unlocked position, the second locking mechanism including a second shaft separate from the first shaft; and
    a linking spring linking the first locking mechanism and the second locking mechanism, the linking spring biasing the second locking mechanism to the operative position, wherein the second locking mechanism comprises a pivotable cam attached to the second shaft, the pivotable cam having an arcuate engaging surface thereon, curvature of the arcuate engaging surface being eccentric to an axis of pivot of the pivotable cam, the arcuate engaging surface being adapted to grippingly engage a fixed surface fixed to a portion of a vehicle.

18. The adjustable steering column according to claim 17, wherein the fixed surface generally extends in a vertical direction.

19. An adjustable steering column comprising:
    at least one moveable steering column section extending axially;
    a first locking mechanism to selectively lock and unlock the at least one moveable steering column section;
    means for preventing vertical movement of the at least one moveable steering column section, the means for preventing vertical movement being separate from and operably engaging the first locking mechanism, the means for preventing vertical movement being axially offset from the first locking mechanism and comprising a pivotable cam having an arcuate engaging surface thereon, the arcuate engaging surface grippingly engaging a generally vertically extending surface fixed to a portion of a vehicle, curvature of the arcuate surface being eccentric to an axis of pivot of the pivotable cam; and
    a resilient linkage operably engaging the first locking member with the means for preventing vertical movement, the resilient linkage being the only operative link between the first locking mechanism and the means for preventing vertical movement.

20. The adjustable steering column according to claim 19, wherein the resilient linkage is a spring attached to the pivotable cam, the spring biasing the pivotable cam to the operative position.

21. The adjustable steering column according to claim 19, wherein the resilient linkage is a spring linking the first locking mechanism and the pivotable cam so that movement of the first locking mechanism between a locked position and an unlocked position causes movement of the pivotable cam between an operative position, where the arcuate engaging surface engages the fixed surface, and an inoperative position, where the arcuate engaging surface is out of engagement with the fixed surface.

22. An adjustable steering column comprising:
at least one moveable steering column section extending axially;
a first locking mechanism to selectively lock and unlock the at least one moveable steering column section; and
a pivotable locking wedge adapted to grippingly engage a fixed surface fixed to a portion of a vehicle, the pivotable locking wedge being movably affixed to the at lease one moveable steering column section and axially offset from the first locking mechanism,
wherein the pivotable locking wedge is connected to the first locking mechanism by a spring, so that movement of the first locking mechanism between a locked position and an unlocked position causes movement of the spring and movement of the spring causes movement of the pivotable locking wedge between an operative position, where the pivotable locking wedge engages the fixed surface, and an inoperative position, where the pivotable locking wedge is out of engagement with the fixed surface.

23. The adjustable steering column according to claim 22, wherein the locking wedge has a curved surface eccentric to an axis of pivot of the locking wedge, the curved surface engaging the fixed surface when the locking wedge is in the operative position.

24. The adjustable steering column according to claim 23, wherein the fixed surface is a generally vertically extending surface.

25. An adjustable steering column comprising:
at least one moveable steering column section extending axially;
a first locking mechanism to selectively lock and unlock the at least one moveable steering column section; and
at least one second locking mechanism to lock the at least one moveable steering column section against movement, the at least one second locking mechanism being axially offset from the first locking mechanism and comprising a pivotable cam having an arcuate engaging surface thereon, the arcuate engaging surface being adapted to grippingly engage a generally vertically extending surface fixed to a portion of a vehicle, curvature of the arcuate engaging surface being eccentric to an axis of pivot of the pivotable cam,
wherein the pivotable cam is linked to the first locking mechanism by a spring, so that movement of the first locking mechanism between a locked position and an unlocked position causes movement of the pivotable cam between an operative position, where the arcuate engaging surface engages the generally vertically extending surface, and an inoperative position, where the arcuate engaging surface is out of engagement with the generally vertically extending surface.

26. The adjustable steering column according to claim 25, wherein the generally vertically extending surface includes a curved portion.

27. The adjustable steering column according to claim 25, wherein the number of second locking mechanisms is two.

* * * * *